US005680202A

United States Patent [19]
Blandin et al.

[11] Patent Number: 5,680,202
[45] Date of Patent: Oct. 21, 1997

[54] CONTAINER FOR A PHOTOSENSITIVE PRODUCT IN STRIP FORM

[75] Inventors: Christophe Louis Michel Blandin; Jean-Pierre Lucien Martel, both of Chalon-Sur-Saone; Didier Duc, Chatenoy-Le-Royal, all of France

[73] Assignee: Eastman Kodak Company, Rochester, N.Y.

[21] Appl. No.: 577,290

[22] Filed: Dec. 22, 1995

[30] Foreign Application Priority Data

Mar. 6, 1995 [FR] France ................ 95 02785

[51] Int. Cl.$^6$ ................ G03B 27/58
[52] U.S. Cl. ................ 355/72; 206/397
[58] Field of Search ................ 355/72, 73, 212, 355/213; 206/408, 409, 397, 391; 242/417, 418.1, 420.6, 564.5

[56] References Cited

U.S. PATENT DOCUMENTS

| | | | |
|---|---|---|---|
| 4,652,117 | 3/1987 | Kogane et al. | 355/72 |
| 5,053,811 | 10/1991 | Watabe et al. | 355/72 |
| 5,287,964 | 2/1994 | Jacquand et al. | 206/397 X |
| 5,362,008 | 11/1994 | Nagel et al. | 355/72 X |

FOREIGN PATENT DOCUMENTS

| | | |
|---|---|---|
| 661586 | 7/1995 | European Pat. Off. |
| 3538048 | 4/1986 | Germany. |
| 446048 | 3/1968 | Switzerland. |
| 91/19222 | 12/1991 | WIPO. |

*Primary Examiner*—Matthew S. Smith
*Attorney, Agent, or Firm*—Susan L. Parulski

[57] ABSTRACT

A container for a photosensitive product in strip form wound on a spool including a) a lightproof enclosure having two end walls, at least one of the end walls being able to be opened so as to define an end opening allowing the insertion/withdrawal of a roll of the photosensitive product in strip form; b) a cantilevered spindle mounted inside the enclosure in order to receive the spool, the spindle being mounted perpendicular to the end walls; and c) a ring for driving the roll out of the enclosure, through the opening.

8 Claims, 4 Drawing Sheets

CONTAINER FOR A PHOTOSENSITIVE PRODUCT IN STRIP FORM

FIELD OF THE INVENTION

The invention concerns a container adapted for transporting photosensitive products in strip form. The invention is particularly suited to the transportation of such photosensitive products between sites manufacturing photosensitive products and processing laboratories using such products in the production, for example on paper, of photographic prints.

BACKGROUND OF THE INVENTION

Traditionally, and as described in application EP-A-0 532 590, photosensitive products in strip form are transported in distribution packaging which, besides the transportation function, also provides for the unwinding of the product under lightproof conditions in order to be used by processing laboratories.

FIG. 1, to which reference is now made, depicts such packaging diagrammatically. This comprises principally a base 17 adapted for being handled by a fork lift truck, a rigid casing 21 designed to protect the strip product, and a cantilevered spindle 10 fixed to the base 17 by means of a frame 40. The casing 21 forms substantially a cylinder and is closed off by an end cover (not depicted) which, when it is removed, leaves clear the free end of the cantilevered spindle so as to enable rolls of products in strip form to be inserted. The distribution packaging also has a lightproof slot 60 enabling the product in strip form to be extracted when it is used, for example, in a photographic printer. The slot 60 is made lightproof in a conventional manner by means of baize or another suitable foam complex. The top part 61 defining the slot is hinged, by means of a hinge 62, thus, by tilting of the top part 61, affording easy access to the strips disposed on the spindle 10. The container also comprises locking means (not depicted) enabling the rolls of photosensitive products on the cantilevered spindle to be immobilized/freed selectively. Typically, these locking means include mechanisms with cams and corresponding cam followers. Furthermore, and in so far as such distribution packaging is adapted for receiving a plurality of rolls, it is desirable to have a number of locking elements at least equal to the number of spools that can be disposed on the spindle. Such locking elements must be accessible from the outside for, as required, immobilizing or freeing, at least with respect to rotation, each of the spools, independently of each other, so as to enable the strip product to be extracted through the slot. A major advantage of this type of distribution packaging lies in its ease of use by operators working with photographic printers.

Other examples of distribution packaging for photosensitive products are described, for example, in the documents EP-A-0 214 928, U.S. Pat. No. 4,741,439, U.S. Pat. No. 3,315,910 and FR-A 1 551 085.

The major drawback of those packagings described above is related to their cost, attributable to a large extent to the structure required for the unwinding and delivering of the film through a lightproof arrangement, the means required for the selective immobilization of the spools on the projecting spindle, etc. Thus, at the present time, an incalculable number of such distribution packagings is required for the transportation of the volume of film or paper required for the operation of the various processing laboratories in a market as vast as the European market, the effects of which are very severe in terms of cost.

SUMMARY OF THE INVENTION

Thus one of the objects of the present invention is to provide a container for the transportation of photosensitive products in strip form that offers substantially the same ease of use as the packaging described above, while substantially resolving the problems referred to previously, notably those relating to cost.

Another object of the present invention is to provide a container designed to receive a plurality of rolls and which has an unloading mechanism including means for indicating, at any moment, the number of rolls already unloaded.

Other objects of the present invention will emerge in detail in the description that follows.

These objects are achieved according to the invention by means of a container (1) for a photosensitive product in strip form wound on a spool, comprising:

a) a lightproof cylindrical enclosure (3) having two end walls (4, 5), at least one of the end walls (4) being able to be opened so as to define an end opening (8) allowing the insertion/withdrawal of a roll (2) of the photosensitive product in strip form;

b) a cantilevered spindle (6) mounted inside the cylindrical enclosure in order to receive the spool (2), the spindle (6) being mounted perpendicular to the end walls (4, 5); and c) means (7, 13, FIG. 3) for driving the roll out of the cylindrical enclosure, through the opening (8).

Advantageously, the means (7, 13, FIG. 3) for driving the roll out of the cylindrical enclosure are able to be actuated from outside the container, the cylindrical enclosure and the spindle both being adapted for receiving a plurality of rolls of the photosensitive product in strip form.

Also advantageously, the container also comprises means (11) for enabling it to be immobilized with respect to an unwinding unit (9) designed to receive the roll of photosensitive product, the unwinding unit (9) having a receiving spindle (10) which is brought into alignment with the projecting spindle (6) so as to receive the roll from the container.

Also advantageously, the driving means comprise a ring (7) mounted so as to be able to be moved along the projecting spindle (6) by means of driving devices (13) enabling the roll or rolls to be pushed out of the container through the opening, the driving devices (13) being able to be actuated from outside the container.

BRIEF DESCRIPTION OF THE DRAWINGS

In the description that follows, reference will be made to the drawings in which.

DETAILED DESCRIPTION OF THE INVENTION

The container according to the invention is, in reality, the result of a double observation: on the one hand, the major part of the cost of a conventional transportation/unwinding unit is attributable to the operation of unwinding and distributing the film, the transportation function affecting its cost only to a much lower degree; and, on the other hand, the number of units needed for the transportation of film is significantly greater than the number of units needed for the unwinding of the photosensitive product in order to use it in a photographic printer.

Figure 2:
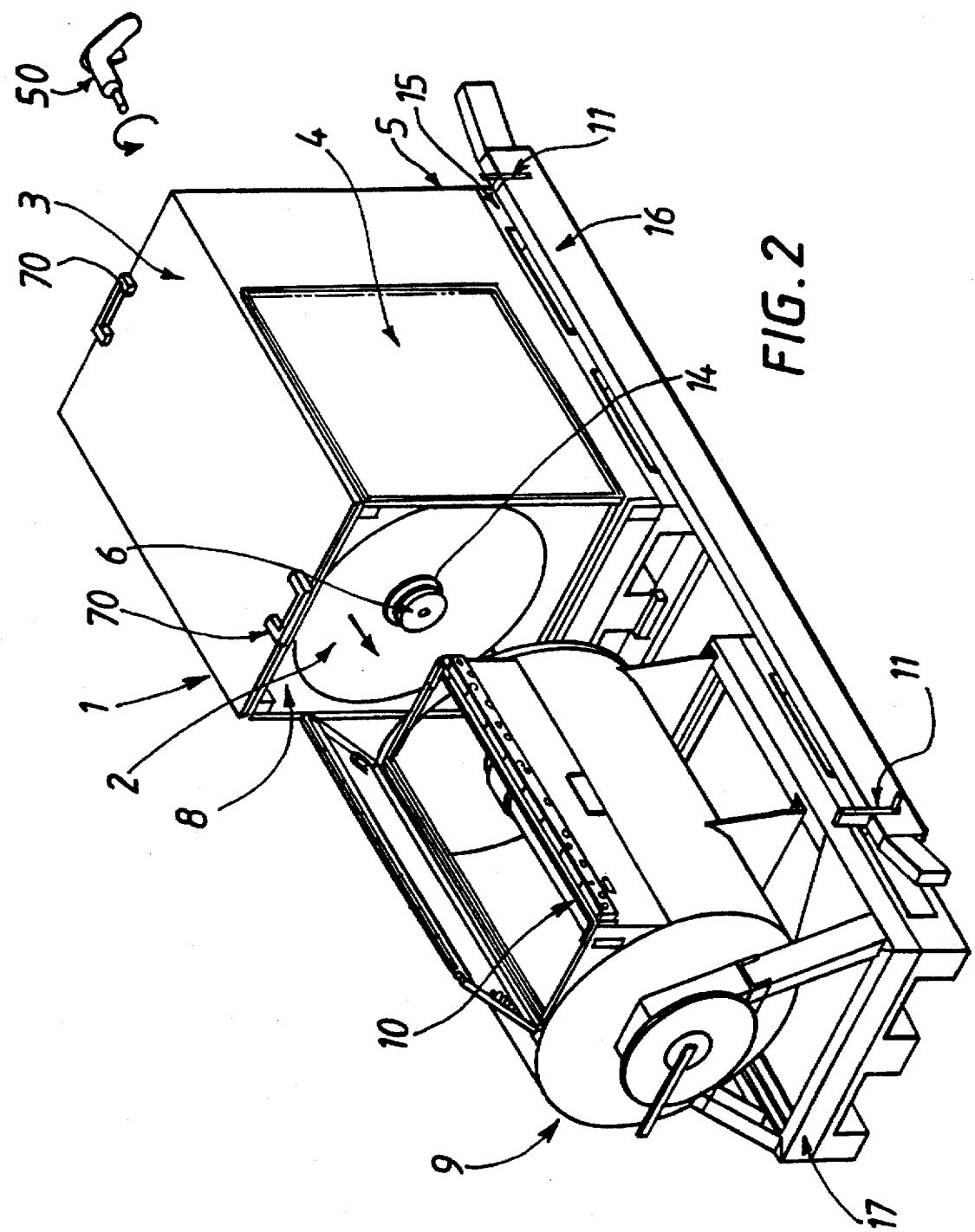
FIG. 2 depicts diagrammatically an arrangement consisting of a container according to the invention and an unwinding unit as used upstream of a photographic printer.

FIG. 2, to which reference is now made, illustrates schematically a preferred embodiment of the container 1 according to the present invention. This comprises principally a lightproof cylindrical case 3. The case preferably takes the form of a right-angled parallelepiped so as to enable the containers to be stacked, notably in order to facilitate their transportation. The container preferably has a base or pallet footing 15 adapted to handling by a fork lift truck. At least one of the end walls 4 can be opened so as to define an end opening 8 for inserting one or more rolls 2 of products in strip form wound on spools 14. According to the embodiment depicted, the door 4 pivots about a vertical axis. Alternatively, the door is mounted so as to slide in order to enable the opening of the door to be delayed until the container is positioned perfectly with respect to the unwinding unit in order to be unloaded. The container according to the invention also comprises a cantilevered spindle 6 designed to receive the roll or rolls. The spindle is mounted so as to project perpendicularly to the end walls 4, 5. By way of example, the cantilevered spindle is mounted on the base 15 by means of a frame (not depicted) consisting of angle sections and plates welded together so as to keep the spindle 6 projecting. Other well-known means are possible for the mounting of the spindle. Various materials can be used to produce such a container. For example, steel or plastic are used.

As can be seen in FIG. 2, the container can include locating members 70 for improving the stability of a stack of several containers (by preventing the containers from sliding on each other).

Figure 1:
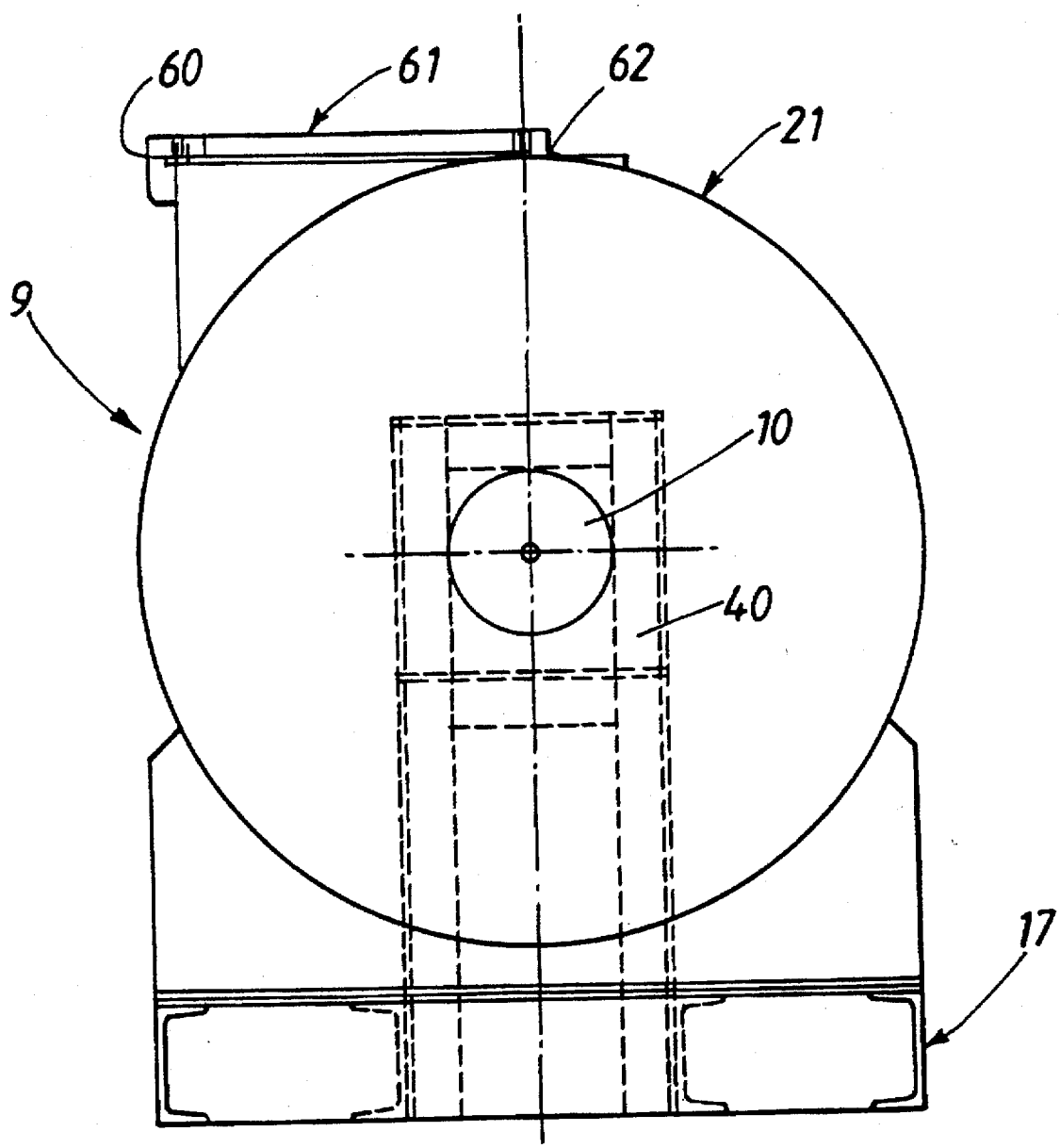
FIG. 1 illustrates diagrammatically a distribution packaging used traditionally for transporting photosensitive products in strip form.

According to an important characteristic of the present invention, the container has means enabling the rolls to be transferred easily from the container 3 to an unwinding unit of the type that has just been described with reference to FIG. 1. The latter consequently requires no additional description.

Figure 3:
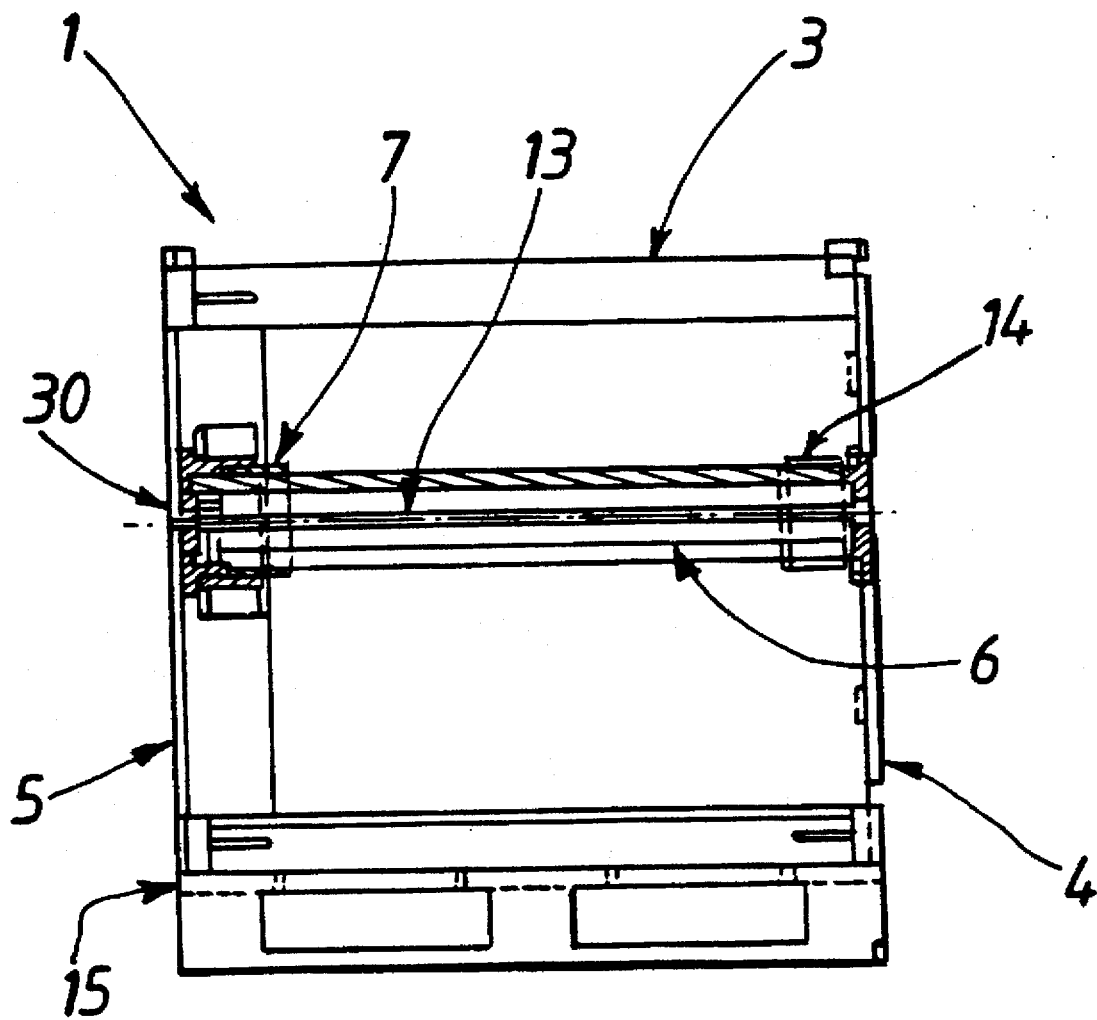
FIG. 3 depicts a container according to the present invention, showing a preferred embodiment of the mechanism affording the easy unloading of rolls of photosensitive products into an unwinding unit.

FIG. 3, to which reference is now made, illustrates schematically the container according to the invention and shows a preferred embodiment of the container unloading device. According to this embodiment, the means enabling the rolls to be unloaded include principally a pusher device, a ring 7, preferably, or a finger, mounted on the spindle 6, and arranged so as to push the roller or rollers out of the container through the opening 4 so as to transfer them onto the corresponding spindle of an unwinding unit. To this end, the ring is driven by means of a screw 13 which is disposed inside the spindle 6 and whose movement enables the ring 7 to move along the spindle 6. According to a first embodiment, a reversible drive system is used so as to permit the automatic return of the ring 7 to the bottom of the container during the reloading of the container under the pressure of the rolls against the ring.

The screw is preferably able to be actuated from the outside, for example by means of a screwing/unscrewing device 50 or any other suitable means. Alternatively, the ring can be driven by means of a pressure cylinder, which can be connected to a pressurized fluid source disposed outside the container.

According to another embodiment, and as mentioned previously, a finger or pin is used in place of the ring. Such a finger is driven by the screw and mounted so as to be able to move in translation on the spindle.

Even though it is preferable for the unloading means to be able to be actuated from the outside, it is clear that this is not an essential feature. For example, the ring could be driven by means of an electric motor, whose operation could be controlled by a switch situated inside the container and to which an operator could have access when the door 4 is open.

It may also be desirable to couple the pusher device to means designed to determine its position along the spindle 6 so as to be able to unload a predetermined number of rolls. By way of example, if the ring is controlled by a screw, a revolution counter is used whose output represents the number of rolls unloaded (or the number of rolls not yet unloaded), the width of the spools on each of the rolls preferably being constant. To this end, the screw is connected to the revolution counter by a transmission system whose transmission ratio in rotation will be adjusted according to the precision desired in the result displayed by the counter. For example, the counter can indicate a value corresponding just to a whole number of rolls or, preferably, indicate a value corresponding to the number of rolls already transferred plus a decimal or centesimal fraction corresponding to the position of the roll being transferred. Examples of revolution counters which can be used according to the present invention are the models DA08 and DA09, which are digital position indicators for direct mounting on a shaft, marketed by SIKO GmbH.

Figure 4:
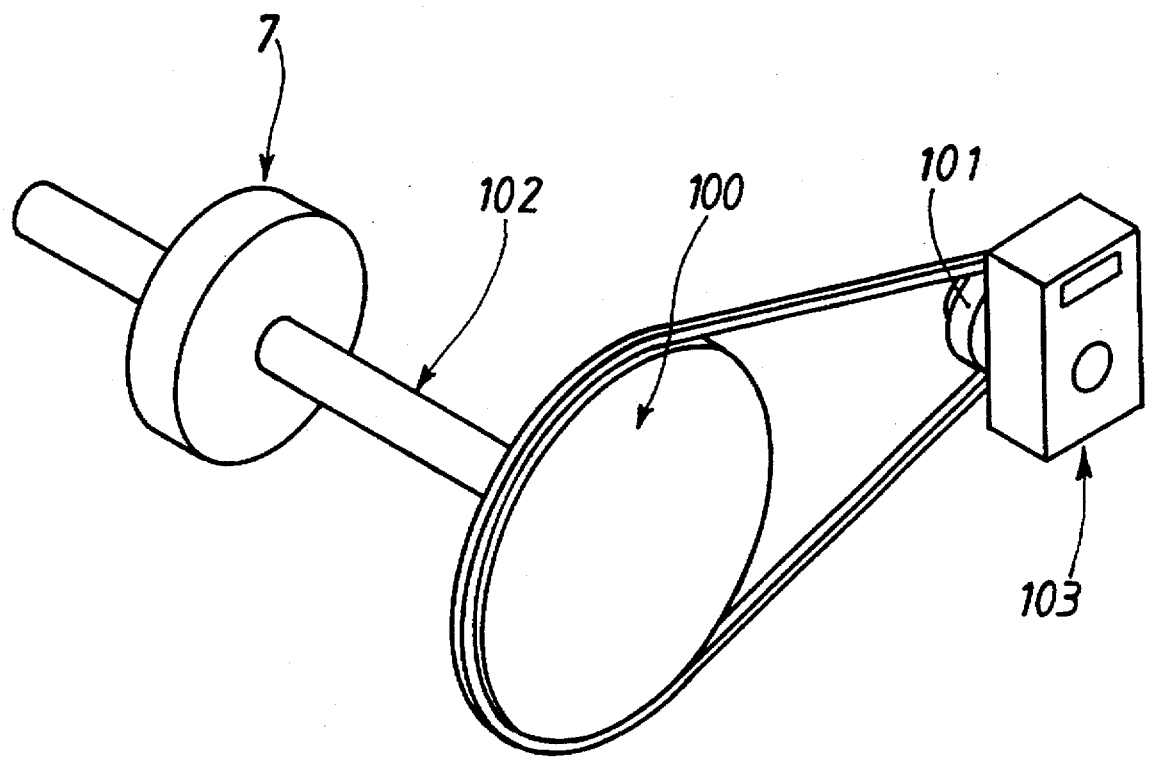
FIG. 4 illustrates schematically another advantageous embodiment of the roll unloading mechanism according to the present invention.

Advantageously, and as is shown diagrammatically in FIG. 4, the transmission system comprises two pulleys 100, 101 disposed between the screw 102 and the revolution counter 103. The first pulley 100, connected directly to the screw 102, is controlled by the movement of the screw 102. The second pulley, disposed between the first one 100 and the revolution counter 103, is controlled by the movement of the first pulley. Preferably, serrated pulleys are used, the ratio of the respective number of teeth on the pulleys 100, 102 being chosen so as to give the desired transmission ratio. The latter characteristic is particularly advantageous when the container contains more than one roll and when the container is not to be unloaded fully. Other devices with sensors can be used.

Also advantageously, when the device enabling the pusher to be controlled is able to be actuated from the outside, the immobilization of the rotation of the rolls loaded in the container is effected by actuating the ring 7 after the door 4 has been closed so as to move it a sufficient distance to enable the rolls to be locked between the door 4, or any other stop means provided for this purpose, and the ring. To this end, a non-reversible screw is preferably used. The latter characteristic constitutes a simple and efficacious means of immobilizing the rolls inside the containers, notably during their transportation.

Similarly, and in order to be able to limit the force generated by the rubbing of the spools on the spindle, an interposed support, able to move between the spool and the spindle, can be used. Advantageously, such an interposed system consists of a strip of material having a coefficient of friction less than that of the spool, and upon which the rolls are placed, the strip being driven in synchronism with the pusher device.

Reference is again made to FIG. 2 in order to explain briefly the unloading of the container 1 into an unwinding unit 9. According to a first approach, the container 1 and the unwinding unit 9 are arranged so that the free ends of their respective spindles are aligned. All these operations are, of course, carried out under inactinic light. According to a first technique, the alignment is effected by means of guide rails 16 (fixed to the floor) designed to receive the respective bases 17 and 15 of the unwinding unit 9 and the container 1. The unit 9 is then immobilizing with respect to the container by means of locking devices 11 provided on the base of the container and/or of the unwinding unit, which cooperate with recesses or notches provided on the guide rails.

According to an alternative, the alignment and immobilization are effected through cooperation between appropriate mechanical devices (guide rods, grooves, hooks, etc) disposed directly on the container and on the unwinding unit. This avoids the use of auxiliary rails.

After their respective covers have been removed, after the respective spindles of the container and unwinding unit have been aligned, and after they have been immobilized with respect to each other, the unloading means (7, 13, 50) are actuated so as to transfer the rolls from the spindle 6 to the spindle 10. The cover of the unwinding unit is then closed again. The latter is then ready to be used in a photographic printer, in the manner described in detail in Patent Application EP-A-0 532 590.

The principal advantages of the present invention are as follows: the container is low in cost compared with conventional containers; the use of this container, whose sole function is transportation, compared with the use of distribution packagings, does not substantially complicate the task of the operators handling these products. The number of unwinding units required for the functioning of processing laboratories is reduced considerably (one unit per photographic printer), which substantially improves the overall efficiency of the transportation operation in terms of cost.

The invention has been described with reference to preferred embodiments of the present invention. It is evident that variants can be made thereto, without departing from the spirit of the invention as claimed hereinafter.

By way of example, the container and the unwinding unit can have, at their respective end openings, means (baffles, flexible lips, slots, bellows) designed to cooperate with each other, so as to be able to allow the rolls to be unloaded under actinic light.

As another example, means are provided on the container for rotatably locking the body of the screwing/unscrewing device with respect to the container so as to avoid any "back kick" that might be harmful for an operator.

Yet, as another example, the door pivots about a horizontal axis. According to another alternative the door may be comprised of a flexible material (such as plastic) mounted on a frame that is designed to light-tightly fit with the opening of the container, with or without any joint.

We claim:
1. A container for a photosensitive product in strip form wound on a spool, comprising:
   a) a lightproof enclosure having two end walls, at least one of the end walls being able to be opened so as to define an end opening allowing the insertion/withdrawal of a roll of the photosensitive product in strip form;
   b) a cantilevered spindle mounted inside the enclosure in order to receive the spool, the cantilevered spindle being mounted perpendicular to the end walls, the enclosure and the cantilevered spindle being adapted for receiving a polarity of rolls of the photosensitive product in strip form;
   c) means for driving the roll out of the enclosure, through the opening, the driving means being actuated from outside the container and comprising a ring mounted so as to be able to be moved along the cantilevered spindle by means of a driving device to push the roll out of the container through the opening; and
   d) means for immobilizing the container with respect to an unwinding unit designed to receive the roll of photosensitive product, the winding unit having a receiving spindle which is brought into alignment with the cantilevered spindle so as to receive the roll from the container.

2. The container according to claim 1, characterized in that it also comprises means for indicating the position of the ring along the cantilevered spindle.

3. The container according to claim 2, characterized in that the driving device comprises a screw bearing the ring and disposed inside the cantilevered spindle.

4. The container according to claim 2, characterized in that the driving device comprises a pressure cylinder able to be connected selectively to a source of pressurized fluid, external to the container.

5. The container according to claim 4, further comprising a pallet footing which, during the unloading of a roll from the container into an unwinding unit, cooperates with a guide rail in order to align the cantilevered spindle and the receiving spindle of an unwinding unit, the unwinding unit also having a pallet footing designed to cooperate with the guide rail.

6. The container according to claim 2, characterized in that the enclosure forms a right-angled parallelepiped so that several containers can be stacked.

7. The container according to claim 1, further comprising means enabling the container to be attached directly to an unwinding unit.

8. The container according to claim 7, characterized in that it is adapted for receiving a plurality of rolls, the container also having means for indicating the number of rolls already unloaded from the container or the number of rolls that remain to be unloaded.

* * * * *